US012652492B2

(12) United States Patent　　　　(10) Patent No.:　US 12,652,492 B2
　Aslandere et al.　　　　　　　　　　(45) Date of Patent:　　Jun. 9, 2026

(54) METHOD OF OPERATING A VEHICLE, DATA PROCESSING CIRCUIT, COMPUTER PROGRAM, COMPUTER-READABLE MEDIUM, AND SYSTEM FOR PROVIDING A TRANSFORMED CABIN SOUND

(71) Applicant: Ford Global Technologies, LLC, Dearborn, MI (US)

(72) Inventors: Turgay Isik Aslandere, Aachen (DE); Cem Mengi, Aachen (DE)

( * ) Notice: Subject to any disclaimer, the term of this patent is extended or adjusted under 35 U.S.C. 154(b) by 158 days.

(21) Appl. No.: 18/587,514

(22) Filed: Feb. 26, 2024

(65) Prior Publication Data
　　US 2024/0298114 A1　　Sep. 5, 2024

(30) Foreign Application Priority Data
　Mar. 1, 2023　(EP) ..................................... 23159414

(51) Int. Cl.
　　*H04R 3/12*　　　(2006.01)
　　*H04L 12/40*　　　(2006.01)
(52) U.S. Cl.
　　CPC .............. *H04R 3/12* (2013.01); *H04L 12/40* (2013.01); *H04L 2012/40215* (2013.01); *H04R 2499/13* (2013.01)
(58) Field of Classification Search
　　None
　　See application file for complete search history.

(56) References Cited

U.S. PATENT DOCUMENTS

| | | | |
|---|---|---|---|
| 5,781,640 A | 7/1998 | Nicolino, Jr. | |
| 10,755,691 B1 | 8/2020 | Herman et al. | |
| 12,195,040 B1 * | 1/2025 | Pronovost | G06N 3/047 |
| 12,307,778 B1 * | 5/2025 | Xu | G06V 20/54 |
| 12,391,255 B2 * | 8/2025 | Shuman | G06V 20/64 |
| 2021/0269045 A1 * | 9/2021 | Katz | G01C 21/3697 |
| 2021/0334976 A1 * | 10/2021 | Lee | G06T 7/11 |
| 2021/0350704 A1 | 11/2021 | Hyun | |

OTHER PUBLICATIONS

European Application No. 23159414.4; search report mailed Aug. 3, 2023.

* cited by examiner

*Primary Examiner* — Paul W Huber
(74) *Attorney, Agent, or Firm* — Christopher Storms; Eversheds Sutherland (US) LLP

(57)　　　　　　ABSTRACT

The present disclosure generally relates to a method of operating a vehicle, a data processing circuit, a computer program, a computer-readable medium, and a system for providing a transformed cabin sound. The vehicle comprises at least one sound receiver sensor, a smart sound system, and at least one speaker arranged inside a vehicle cabin. An input sound is recorded external to the vehicle using the at least one sound receiver sensor. An input signal being based on the recorded input sound is transmitted to the smart sound system. The input signal is transformed according to at least one transformation configuration into a transformed output signal. The transformed output signal is transmitted to the at least one speaker and an output sound being based on the transformed output signal is outputted with the at least one speaker.

14 Claims, 7 Drawing Sheets

80

Updating generator mapping policy

92

Providing training sounds to generator

82

Generating fake sounds based on generator mapping policy

84

Providing training sounds and fake sounds to discriminator

86

Determining confidence levels using discriminator

88

Confidence levels equals or exceeds threshold?

94

90

NO

YES

Operating mapping policy

96

1

METHOD OF OPERATING A VEHICLE, DATA PROCESSING CIRCUIT, COMPUTER PROGRAM, COMPUTER-READABLE MEDIUM, AND SYSTEM FOR PROVIDING A TRANSFORMED CABIN SOUND

CROSS-REFERENCE TO RELATED APPLICATIONS

The application herein asserts priority to and incorporates by reference European Application No. 23159414.4, filed on Mar. 1, 2023.

FIELD OF THE INVENTION

The present disclosure generally relates to a method of operating a vehicle, a data processing circuit, a computer program, a computer-readable medium, and a system for providing a transformed cabin sound.

BACKGROUND

In view of enhanced isolation measures, car interiors are becoming more silent nowadays. Although this provides the possibility to save the drivers from unwanted stress due to outside sounds, the enhanced isolation generally goes hand in hand with a potentially reduced situational awareness of the drivers with regard to the surroundings outside the vehicles. Put differently, the enhanced sound isolation causes the drivers to less discern the surrounding outside the vehicle.

Additionally, the measures for establishing state-of-the-art sound isolation of vehicle cabins require specialized materials and construction work such that the manufacturing efforts and expenses are high. For example, one approach utilizes active sound cancelation. However, even active sound cancelation is not suited to cancel at least certain outside sounds. In addition, the parameters of the vehicle itself, such as speed, affects the sound within the vehicle cabin, for example due to speed-caused wind noises or running noise of the tires. These noises can cause stress to the drivers and put drivers into distracted moods.

U.S. Pat. No. 10,755,691 B1, U.S. Pat. No. 5,781,640 A, US 2021/0197667 A1 disclose generic systems used for transforming sounds. US 2021/0360349 A1 discloses a generic method employing artificial intelligence based on a generative adversarial network.

SUMMARY

An objective technical problem to be solved may be considered to consist in overcoming or at least reducing the disadvantages according to the prior art. In particular, a need may be considered to exist for a method of operating a vehicle which allows an enhanced situational awareness of the drivers to be achieved while less stress is caused to the drivers. Preferably, the manufacturing expenses to employ the method are low.

The objective technical problem is solved by the subject matter according to the independent claims. Additional embodiments are indicated within the dependent claims and the following description, each of which, individually or in combination, may represent aspects of the disclosure. Some aspects of the present disclosure are presented with regard to methods, others with regard to respective devices. However, the features are correspondingly to be transferred vice versa.

A summary of certain embodiments disclosed herein is set forth below. It should be understood that these aspects are presented merely to provide a brief summary of these embodiments and that these aspects are not intended to limit the scope of this disclosure. This disclosure may encompass a variety of aspects that may not be set forth below.

According to an aspect of the present disclosure, a method of operating a vehicle is provided. The vehicle comprises at least one sound receiver sensor, a smart sound system, and at least one speaker arranged inside a vehicle cabin. The smart sound system is coupled to at least the at least one sound receiver sensor and the at least one speaker. The method comprises at least the following steps:

An input sound external to the vehicle is recorded using the at least one sound receiver sensor.

An input signal being based on the recorded input sound is transmitted to the smart sound system.

The input signal is transformed according to at least one transformation configuration of a plurality of different transformation configurations into a transformed output signal using at least one data processing circuit of the smart sound system applying an artificial intelligence algorithm based on at least one generative adversarial network of a plurality of different generative adversarial networks. Each generative adversarial network is assigned to a different transformation configuration.

The transformed output signal is transmitted to the at least one speaker and an output sound being based on the transformed output signal is outputted with the at least one speaker.

Consequently, a method is provided which enables, on the one hand, that the driver recognizes external sounds as these are outputted inside the vehicle cabin in a transformed fashion, and, on the other hand, that the driver is less stressed due to the transformation procedure applied to the recorded sounds. In particular, the input signals (representing the recorded input sounds) may be transformed such that output signals (representing output sounds) are generated which are calmer or more relaxing compared to the input sounds. Additionally, or cumulatively, the output sounds may at least partially comprise sound portions being exciting for the respective driver, such as nature-based sound portions like forest or beach sounds or music sound portions. Put differently, with the aid of the present method, the driver has a better mood and less stress while also having situational awareness inside the vehicle with regard to the surroundings thereof as the driver is not fully cut out from the exterior environment.

According to another aspect, a system is provided for providing a transformed cabin sound. The system comprises at least one sound receiver sensor, a smart sound system, and at least one speaker arranged inside a vehicle cabin. The smart sound system is coupled to at least the at least one sound receiver sensor and the at least one speaker. The system is configured to:

record an input sound external to the vehicle using the at least one sound receiver sensor, transform an input signal being based on the recorded input sound according to at least one transformation configuration of a plurality of different transformation configurations into a transformed output signal using at least one data processing circuit of the smart sound system applying an artificial intelligence algorithm based on at least one generative adversarial network of a plurality of different generative adversarial networks, wherein each generative adversarial network is assigned to a different transformation configuration, transmit the transformed output signal to the at least one speaker, and output an output sound being based on the transformed output signal with the at least one speaker.

The advantages explained in view of the respective method are readily achieved by the corresponding system as well. In particular, a system is provided requiring only little manufacturing expenses by which the situational awareness of the driver with regard to an outside of the vehicle is kept while the driver is not emotionally affected in an unwanted manner.

Within the present context, artificial intelligence (AI) may describe a software- or hardware-based process of imitating intelligent behaviour. In particular, AI may include optimization and machine learning. Optionally, the at least one smart sound system may comprise the AI algorithm. In an alternative, the AI algorithm may also be part of a different device. However, the AI algorithm may be executed based on a control signal provided by the smart sound system, i.e. a data processing circuit thereof. The device comprising the AI algorithm may also comprise additional hardware components to employ machine learning algorithms in real time. In other words, a computer program (software) or hardware-based system may comprise instructions such that intelligent behaviour is imitated. Based on the AI algorithm, the input signal is transformed and a transformed output signal is achieved. Generally, AI may be implemented using at least one deep neural network.

A deep neural network consists of a large number of connected neurons organized in layers. Deep neural networks allow features to be learned automatically from training examples. In this regard, a neural network is considered to be "deep" if it has an input and output layer and at least one hidden middle layer. Each node is calculated from the weighted inputs from multiple nodes in the previous layer. Put differently, during learning, the algorithm follows a randomly initialized policy describing the mechanism of the deep neural network. The weights of all neurons may be considered to represent a specific mapping policy from an input state (here the input signal representing an input sound) to an output state (here the transformed output signal representing an output sound in view of the at least one transformation configuration) of the neural network.

In some embodiments, the sound receiver sensor may comprise a device configured to detect an external sound and to provide an input signal based on the detected external sound. For example, the sound receiver sensor may comprise a microphone. Generally, the sound receiver sensor may be arranged outside the vehicle, for example coupled to an exterior surface thereof. However, in some embodiments the sound receiver sensor may also be arranged inside a housing of the vehicle while still being able to record external sounds. For example, the housing may comprise respective noise permeable housing portions.

Preferably, each sound receiver sensor is configured to generate an input signal based on the recorded input sound. In this regard, each sound receiver sensor may comprise at least one data processing circuit.

Optionally, multiple sound receiver sensors may be utilized. In this regard, each sound receiver sensor may be configured to provide an input signal to the smart sound system. Subsequently, the smart sound system may establish a combined input signal based on the different input signals received from different sound receiver sensors.

In an alternative, an input control device may be provided being coupled to a plurality of sound receiver sensors. The input control device may then receive input signals of the respective sound receiver sensors and, furthermore, may be configured to generate a single input signal therefrom. The single input signal may then be provided from the input control device to the smart sound system.

Optionally, the sound receiver sensor may be multipurposed. For example, the sound receiver sensor may be used for communication techniques, e.g. wireless phone communication or for noise cancellation procedures provided by different systems of the vehicle.

Preferably, a speaker may comprise an electroacoustic transducer. Each speaker is at least configured to convert the transformed output signal into a corresponding output sound. Generally, at least one speaker is arranged inside a vehicle cabin of the vehicle. The output sound is listened to through the speaker.

Optionally, the speaker may be multipurposed. For example, the speaker may also be used to listen to a radio of the vehicle or for noise cancellation provided by different systems of the vehicle.

In some embodiments, multiple speakers may be provided. In this regard, the multiple speakers may all be arranged within the vehicle cabin. In an alternative, at least one speaker may also be arranged outside of the vehicle cabin.

In case that multiple speakers are provided, the transformed output signal provided by the smart sound system may comprise individual signal portions for each respective speaker of the plurality of speakers. For example, the speakers may be arranged and configured according to a multichannel sound system. In this case, the transformed output signal may comprise signal portions for each respective channel of the multichannel sound system. The communication between the speakers and the smart sound system may be such that each respective speaker receives at least the signal portion intended to be outputted by the respective speaker. Put differently, signal portions which are intended to be outputted by other speakers do not need to be transmitted to the speaker in question.

Within the present context, the smart sound system may be considered an embedded device arranged inside the vehicle.

Generally, the smart sound system may also form part of a human-machine-interface sound control module, such as a vehicle entertainment device.

Within the present context, a transformation configuration may be considered a specific relationship which is to be included when transforming the input signal into the output signal with the aim to provide output sounds of a specific type. The transformation configuration may define certain properties, such as sound schemes, which are to be included within the output sounds. For example, specific sound schemes may be expected by the user to appear or to be included (embedded or overlaid) within the output sound. For example, a first transformation configuration may include a transformation such that exterior sounds are transformed at least partially into beach sounds. A different transformation configuration may include a transformation such that the exterior sounds are transformed at least partially into bird sounds. Also, the transformation may be partial in a sense that the influences determined by the transformation are only overlaid to the exterior sounds which are reduced in loudness. Put differently, the transformation configuration may also result in a superposition of different sound portions.

Optionally, when transforming the input signal into the output signal multiple transformation configurations may be applied. In this regard, the input signal may first be treated by the AI algorithm based on a first generative adversarial network (GAN) being assigned to a first transformation configuration and, subsequently, by the AI algorithm based on a second GAN being assigned to a second transformation configuration. This means that multiple transformation procedures may be carried out following different transformation configurations subsequently before finally the overall transformed output signal is determined.

The transformation configuration to be applied is at least determined by the smart sound system. In this regard, the determination may be based on the external sounds recorded based on which the input signal is based. For example, if external sounds with high sound volumes are recorded, the smart sound system may determine that a specific transformation configuration is to be applied such that the transformed output signal corresponds to output sounds having a sound volume which is much lower compared to the recorded input sounds.

Additionally or cumulatively, the smart sound system may consider additional aspects and parameters when determining which transformation configuration is to be applied. For example, at least one of user inputs, vehicle parameters (vehicle speeds and the like), exterior parameters (weather conditions and the like), and a radio data stream may be considered. As a consequence of the determination procedure, a single or multiple transformation configurations are determined based on which the received input signal is transformed.

Within the present context, a GAN may be considered an algorithmic software-based or hardware-based architecture that uses at least two neural networks. The neural networks are pitted against one another to generate new, synthetic instances of data. During a training phase, the underlying mapping policies of the neural networks are adapted until the synthetic data can pass for real data.

Since the different transformation configurations require specific modifications of the transformation processes to be considered, a single GAN is assigned to each of the different transformation configurations. Accordingly, the required modification of the transformation process of the input signal into the transformed output signal is precisely adjusted in view of the transformation configurations applied by the AI algorithm. Hence, compared to known methods where only a single GAN is applied, the signal-to-signal translation is enhanced as to the variety of different GANs serving for the transformation according to different transformation configurations. For example, if one GAN is used to transfer e.g., horn sounds to thunder sounds, another may be configured to transfer e.g., traffic noise to beach ambient sounds.

Preferably, the method may be carried out in an automated fashion. For example, the smart sound system may receive the input signal. Based on the received input signal, the smart sound system may determine which transformation configuration is best suited to be applied in this regard. Upon a variation of the received input signal or upon receipt of additional parameters, such as user inputs or vehicle parameters, the smart sound system may adjust the transformation configuration to be applied. For example, based on a specific weather condition, a different transformation configuration may automatically be applied compared to a high-speed scenario on a motorway.

Optionally, the smart sound system is coupled to at least one human-machine-interface (HMI) configured to receive at least one user input. The at least one transformation configuration may then be determined at least partially based on the at least one user input. This allows for a personalization of the transformation configuration to be included within the transformation procedure. Accordingly, a user may specify how the input signal is to be transformed. In particular, the user input may specify at least one or also multiple transformation configurations to be respected.

In some embodiments, the smart sound system may also form part of a mobile device being coupled to the vehicle, such as smart phones or tables. Accordingly, the smart sound system may be software-implemented. The HMI may then be provided by the respective smart phone or tablet.

The system can also be personalized using the mobile device, e.g., based on a preference that specific nature sounds are to be used. Exemplary nature sounds comprise beach sounds, forest sounds, rain sounds, or winter sounds. Other preferences may comprise music genres, such as jazz or hip-hop styles. The mobile device access can optionally be made through apps, such as e.g., Ford Pass. In an alternative, the access may also be achieved through web-based services.

Preferably, the smart sound system is coupled to a bus system of the vehicle. The at least one transformation configuration may then be determined at least partially based on vehicle parameters communicated via the bus system. Since listening to a bus system is always allowed, the smart sound system may recognize vehicle parameters being communicated via the bus system, such as a velocity of the vehicle. Based on such parameters, a specific transformation configuration may be elected by the smart sound system being specifically tuned in view of the vehicle parameters received via the bus system. As a consequence, the output sound better fits the specific properties of the vehicle according to the current vehicle parameters.

Exemplary parameters, which may be considered to determine a specific transformation configuration may comprise at least one of a vehicle speed, a battery level, and weather conditions.

Preferably, the bus system may comprise a CAN bus (controller area network bus). The CAN bus represents a robust vehicle bus standard designed to allow microcontrollers and devices to communicate with each other's applications. The CAN network can include data from all the controllers in the vehicle.

Optionally, the smart sound system is coupled to a radio device of the vehicle. The at least one transformation configuration may then be determined at least partially based on a signal received by the smart sound system from the radio device. In other words, the output sound may comprise sound portions which relate to a radio data stream of a radio device. For example, the radio data stream may be underlaid to different signal portions reflecting the exterior sounds recorded. Preferably, a user input may be used to specify a radio data stream which is to be considered in this regard.

In some embodiments, the vehicle comprises an AI computing device being coupled to the smart sound system. The AI computing device comprises the AI algorithm. Accordingly, the AI computing device may be separate of the smart sound system. For example, this may be preferred if the smart sound system is provided software-based on mobile devices coupled to the vehicle.

In an alternative, the AI computing device may also form part of the smart sound system, for example if a dedicated hardware device is provided combining the respective functionalities. Accordingly, the variability for providing the respective functionalities is enhanced.

However, the AI computing device generally forms part of the vehicle and is not provided exterior thereof.

Optionally, the smart sound system is coupled to a server circuit. Then, the smart sound system is configured to receive at least one operating mapping policy from the server circuit. The least one operating mapping policy comprises weights of neurons included in at least one neural network to be applied by the AI algorithm of the AI computing device. Put differently, while the underlying hardware or software-based architecture of the AI computing device and the AI algorithm is provided with the vehicle, the at least one operating mapping policy specifying how the algorithm is to be applied, may be received from a server circuit. As a consequence, the at least one operating mapping policy may be uniform for all vehicles being operated according to the present method comprising a system as described herein before. This allows the operating mapping policy to be determined based on a common training procedure. Therefore, separate training procedures may be avoided which means that the operating mapping policy may be efficiently determined.

The server circuit may be considered a cloud architecture. The cloud architecture refers to a data center available to connected vehicles and users over the internet. The cloud architecture is distributed over multiple locations from central servers.

Optionally, the at least one operating mapping policy is determined based on at least the following steps which may form part of the present method:

S1 providing, as an input to a generator of the respective GAN, at least one training sound (or a respective input signal representing a training sound), wherein the generator comprises a first neural network;

S2 generating, using the generator, as an output at least one fake sound (or a respective fake signal representing a fake sound) associated to the at least one training sound based on a generator mapping policy assigned to the generator;

S3 providing, as an input to a discriminator of the respective GAN, the at least one training sound (or a respective input signal representing the training sound) and the at least one fake sound (or a respective fake signal representing the fake sound) associated thereto, wherein the discriminator comprises a second neural network; and S4 determining, using the discriminator, as an output a confidence level matrix in view of the at least one training sound and the at least one fake sound associated thereto, wherein the confidence level matrix determines whether a respective sound (or a respective signal) of the at least one training sound and the at least one fake sound is considered authentic.

Here, the generator mapping policy is adjusted in view of individual weight levels included therein upon repetitions of the steps S1 to S4 at least until the confidence level matrix comprises individual confidence levels being equal to or exceeding a confidence level threshold. The at least one operating mapping policy at least includes the so-adjusted generator mapping policy.

The operating mapping policy may be considered to represent the results of the training phase of the respective GAN. In particular, the operating mapping policy determines the weights of neurons included within neural networks of the respective GAN for the use phase after training.

The training phase can be considered to represent a phase during which the weight of the neurons of the underlying neural networks are adjusted such that the generator generates more realistic synthetic data instances, and such that for the discriminator, from cycle to cycle, it is more challenging to decide which data instance (original input data or fake data) is authentic.

In more detail, in view of an input signal, the generator, using the first neural network of the GAN, generates new synthetic data instances. The discriminator of the GAN comprises a second neural network. The discriminator evaluates the original data and the new synthetic data instances with regard to authenticity. In other words, the discriminator decides which instance of the original data and the new synthetic data it considers to be authentic. Based on the decision process of the discriminator, the generator mapping policy is adapted between subsequent cycles. Then, within a subsequent cycle, the generator may potentially create new, synthetic signals that are more challenging to be reviewed by the discriminator since the adjusted generator mapping policy enables the generator to generate even more realistic fake signals. The generation of the fake sounds may be based on convolutional neural network algorithms which are employed in this regard. In an alternative, also LSTM (long short-term memory) recurrent neural network algorithms may be employed in case of the discriminator and the generator.

For example, during the first cycle, the synthetic signal generated by the generator may be of rather bad quality. Therefore, the confidence level matrix determined by the discriminator may specify that the (original training) input signal is believed to be authentic at 90% probability and a synthetic signal (generated by the generator) is believed to be authentic at 10% probability. As a consequence, the weights of the neurons included within the generator mapping policy may be adjusted for the subsequent step. During a subsequent cycle, the synthetic signal may be more realistic resulting in modified confidence levels of 80% vs. 20% probability. Over a number of repetitions, this process may be used to adjust the generator mapping policy until the discriminator determines confidence levels which are equal to each other or at least above a certain threshold. For example, if the discriminator determines both data instances (original data and fake data) at 50% probability both to be authentic, this may be regarded as the discriminator may not be capable anymore of distinguishing between authentic and fake signals. This corresponds to the generator being able to generate synthetic signals which are so realistic that they are not distinguishable from the actual original data anymore. Hence, the generator is optimized to create the most realistic signals that the discriminator cannot easily identify. This training procedure results in a generator mapping policy which is suitable for use phases. Therefore, if the confidence level determined by the discriminator is equal to or exceeds the confidence level threshold, the so-adjusted generator mapping policy is considered to represent at least a portion of the operating mapping policy provided by the server circuit in view of the respective GANs for the use phase.

Within the present context, the confidence level threshold may not necessarily represent a single number. Rather, the confidence level threshold may also comprise different numbers according to a threshold matrix comprising entries corresponding to the signals to be evaluated by the discriminator. Moreover, the confidence level threshold may be different for different training procedures with regard to different GANs.

The server circuit (cloud architecture) also enables a distributed training procedure to be applied. In other words, training of the respective GANs can be performed simultaneously by multiple vehicles comprising data processing circuits (or smart sound systems as well as AI computing devices) having the GANs. Therefore, the training phase is not performed on the basis of a single GAN but on the basis of multiple GANs included in different vehicles, i.e. within a "fleet" of vehicles. This may also be referred to as cloud training. Accordingly, more sophisticated results are obtained at shorter time scales. Furthermore, the training may continuously be performed also during the use phase of the respective GANs. This may result in even more sophisticated operating mapping policies distributed by the server circuit.

Preferably, the GANs are trained in an unsupervised manner using a collection of signals from the source (input signals) and target domain (transformed output signals). The source and target domains do not need to be related in any way. For example, the GANs are used to convert horn related input signals to bird chirping output signals, wind noise input signals to beach sound output signals and the like. The respective source and target domain sounds are accordingly collected.

In some embodiments, a communication between components employed for carrying out the above-described method may utilize wired or wireless communication. For example, near field communication standards or mobile communication standards, such as 4G, LTE, or 5G may be employed. Also, the communication may utilize Ethernet, HDMI, USB, or Wi-Fi.

According to another aspect, a data processing circuit comprising means for carrying out at least one step of the method as described herein before is provided.

According to yet another aspect, a computer program comprising instructions which, when the computer program is executed by a computer, cause the computer to carry out at least one step of the method as described herein before is provided.

According to even a further aspect, a computer-readable medium comprising instructions which, when executed by a computer, cause the computer to carry out at least one step of the method as described herein before is provided.

According to still another aspect, a vehicle comprising a system as described herein before is provided. The at least one sound receiver sensor is configured to record an input sound external to the vehicle. The vehicle comprises also a smart sound system having a data processing circuit which is configured to transform an input signal received from the sound receiver sensor into a transformed output signal. In addition, the vehicle comprises at least one speaker being configured to receive the transformed output signal and to output the respective output sound to a vehicle cabin.

This so-designed vehicle provides the possibility to reduce disturbances for the driver such that the driver may show enhanced situational awareness with regard to an outside of the vehicle while having a better mood compared to prior art sound transformation systems.

All features explained with regard to the various aspects can be combined individually or in (sub) combination with other aspects.

BRIEF DESCRIPTION OF THE DRAWINGS

The aspects and advantages of the claimed subject matter will become more readily appreciated, as the same become better understood by reference to the following detailed description when taken in conjunction with the accompanying drawings. In the drawings:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown but are to be accorded the widest scope consistent with the principles and features disclosed herein.

All of the features disclosed hereinafter with respect to the example embodiments and/or the accompanying figures can alone or in any sub-combination be combined with features of the aspects of the present disclosure including features of preferred embodiments thereof, provided the resulting feature combination is reasonable to a person skilled in the art.

For the purposes of the present disclosure, the phrase "at least one of A, B, and C", for example, means (A), (B), (C), (A and B), (A and C), (B and C), or (A, B, and C), including all further possible permutations when greater than three elements are listed. In other words, the term "at least one of A and B" generally means "A and/or B", namely "A" alone, "B" alone or "A and B".

Figure 1:
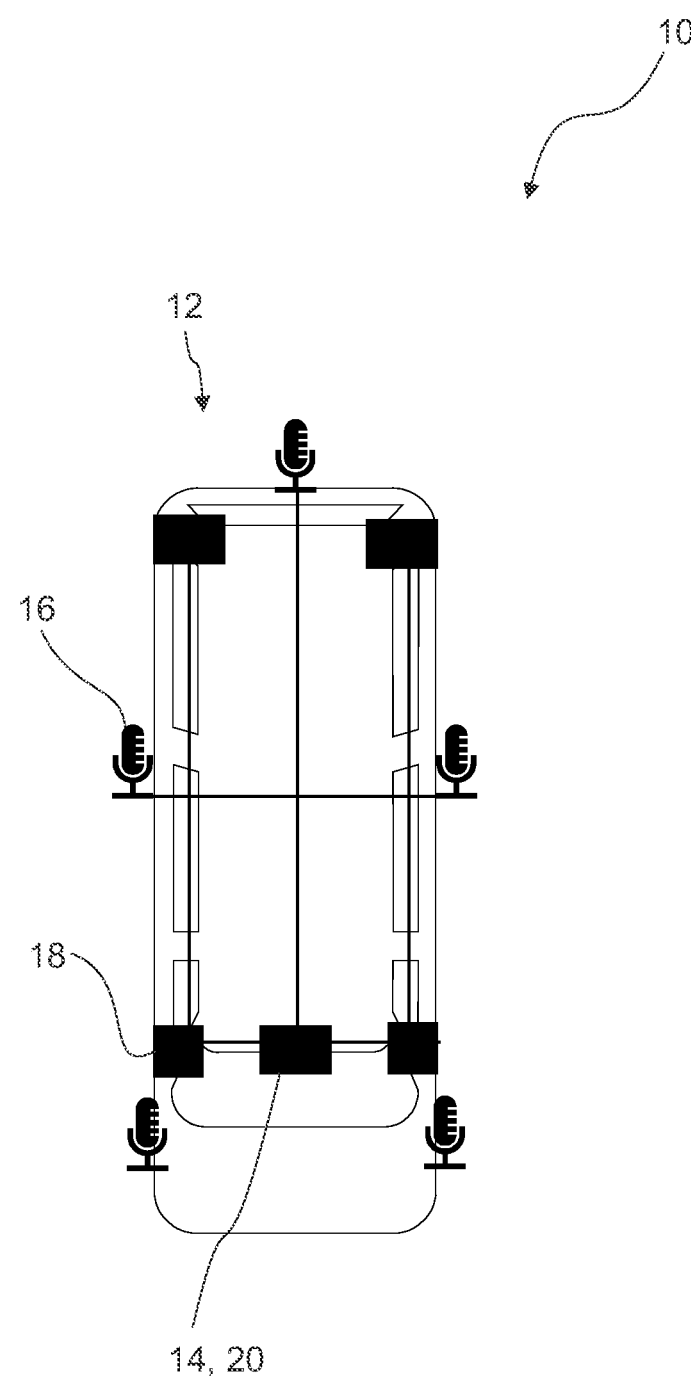
FIG. 1 is a schematic drawing of a vehicle according to an embodiment.

FIG. 1 is a schematic drawing of a vehicle 10 according to an embodiment.

The vehicle 10 comprises a system 12. The system 12 comprises a smart sound system 14. According to this embodiment, the system 12 also comprises multiple microphones 16 (sound receiver sensors) and multiple speakers 18. While the microphones 16 are arranged outside the vehicle cabin, the speakers 18 are mounted at an interior of the vehicle cabin.

The smart sound system 14 comprises at least one data processing circuit 20. The smart sound system 14 is coupled to the microphones 16 and to the speakers 18.

The microphones 16 are configured to record external sounds and to provide respective input signals based on the detected external sounds to the smart sound system 14.

The smart sound system 14 is configured to transform the received input signals into transformed output signals according to a transformation configuration and to provide the output signals to the speakers 18.

The speakers 18 are configured to output a sound based on the received output signals.

Figure 2:
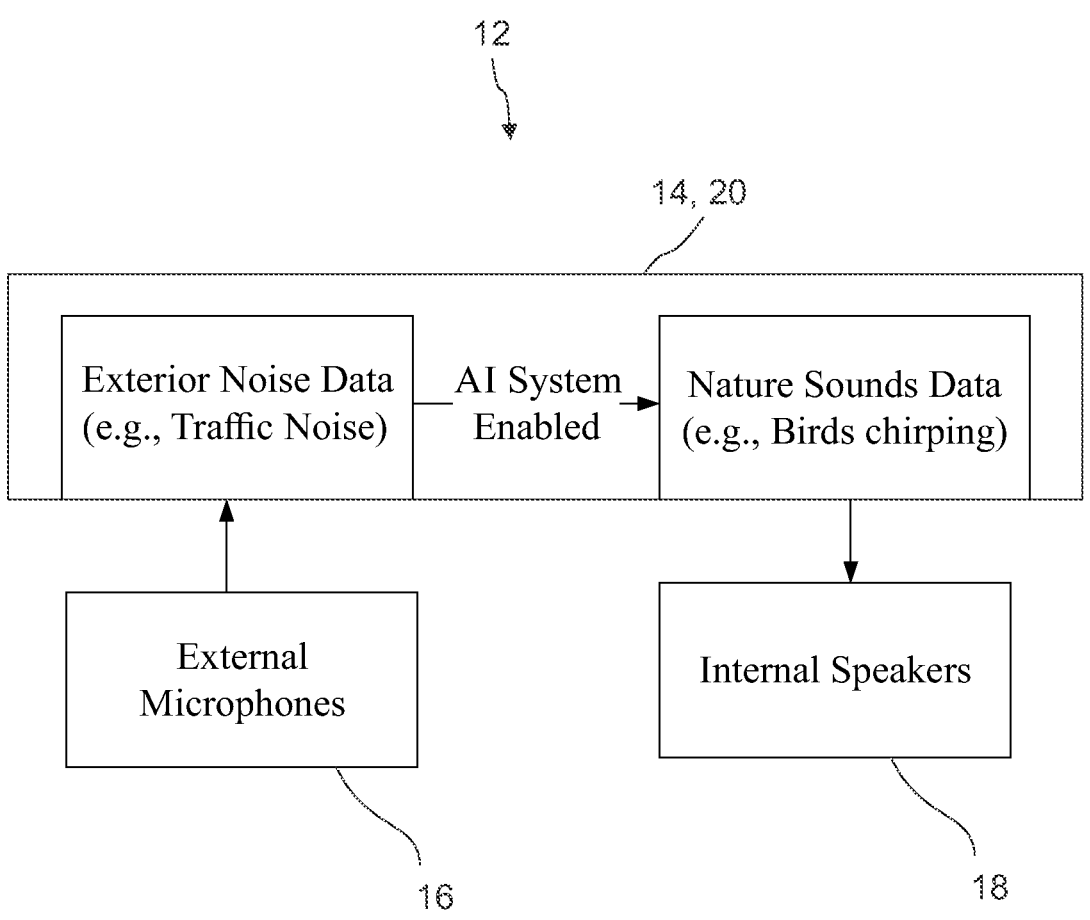
FIG. 2 is a schematic drawing of the hardware components of a system according to an embodiment.

FIG. 2 is a schematic drawing of the hardware components of a system 12 according to an embodiment. The smart sound system 14 transforms the received input signal into output signals based on a transformation configuration employing an artificial intelligence (AI) algorithm. For example, exterior sounds such as traffic noise may be transformed at least partially into nature sounds such as bird chirping. In this regard, the smart sound system 14 applies an AI algorithm which utilizes at least one generated adversarial network (GAN).

Moreover, the smart sound system determines the transformation configuration to be applied, for example based on the received input signal, optionally considering additional received parameters or data.

For each different transformation configuration a different GAN is provided. This means that generally a plurality of different GANs is provided, where a specific one or, optionally, also multiple ones are employed during a specific transformation procedure.

Figure 3:
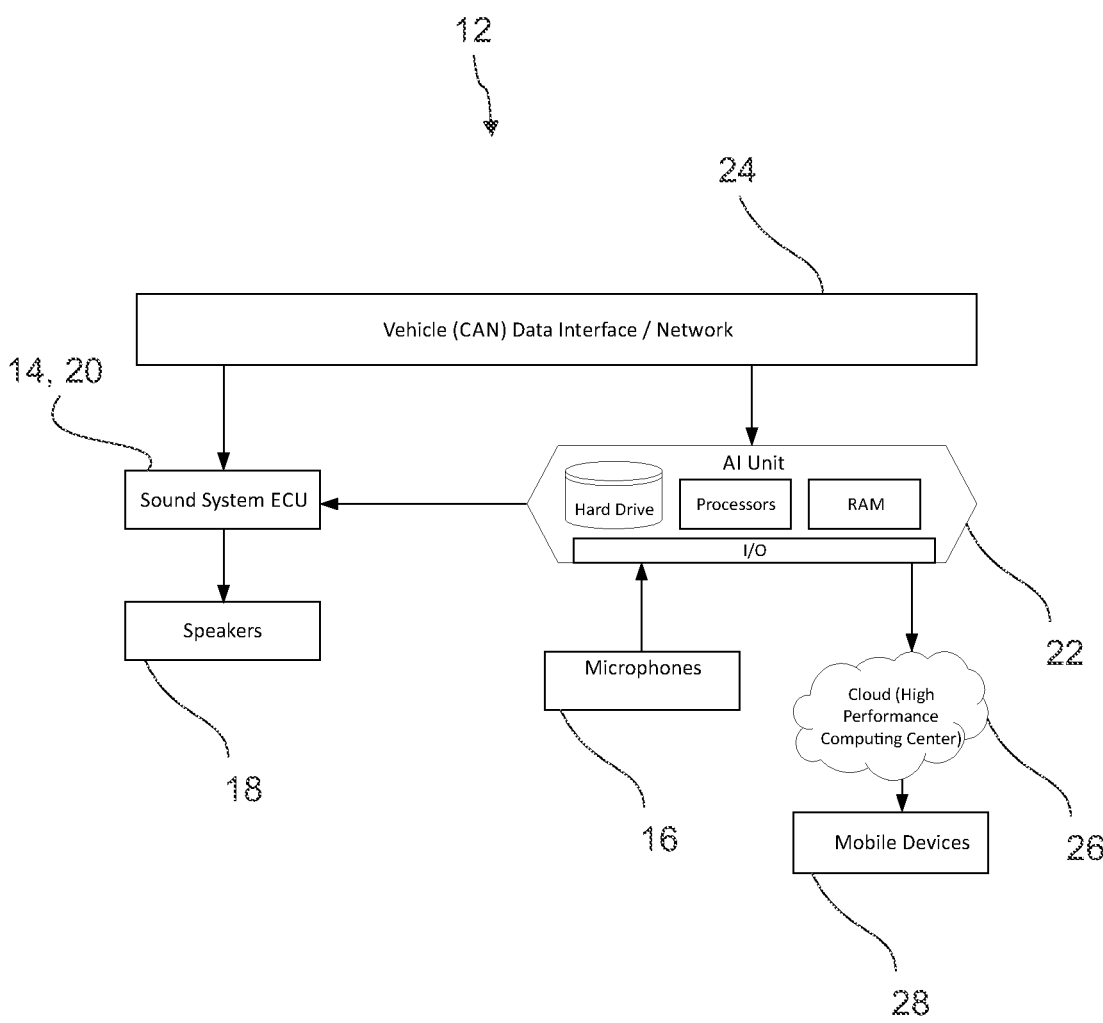
FIG. 3 is a schematic drawing of the hardware components of a system according to another embodiment.

FIG. 3 is a schematic drawing of the hardware components of a system 12 according to another embodiment.

According to this embodiment, the system 12 comprises an AI computing device 22 separate of the smart sound system 14. The AI computing device 22 comprises the AI algorithm. Although the AI computing device 22 is separate of the smart sound system 14, both components forms part of the vehicle 10. Still, the smart sound system 14 employees a superordinate functionality in the sense that it controls the transformation procedure.

The AI computing device 22 comprises at least certain data processing components, such as a hard drive, a data processing circuit, a random-access memory and an input-output device for data communication capabilities.

According to this embodiment, the input signals being based on the recorded input sounds are provided from the microphones 16 to the AI computing device 22. Although not shown here, the data communication may be employed via the smart sound system 14.

According to this embodiment, the vehicle 10 also comprises a CAN bus system 24 to which the smart sound system 14 as well as the AI computing unit 22 are coupled. From the CAN bus system 24, vehicle parameters may be received or extracted which may be provided to the smart sound system 14 and the AI computing device 22 as well.

Within the present embodiment, the AI computing device 22 is also coupled by a wireless communication means to a server circuit 26 providing a cloud architecture.

In addition, the system 12 is coupled to mobile devices 28 via the server circuit 26 using a wireless communication standard, such as a mobile phone communications standard.

Using the mobile devices 28, user inputs may be received by the system 12.

The user inputs may specify at least partially according to which transformation configuration the input signals are to be transformed by the AI computing device 22.

Alternatively or cumulatively, vehicle parameters received from the CAN bus system 24 may also be included when determining the transformation configuration to be employed.

Based on the received input signals, the smart sound system 14 determines a single or multiple transformation configurations to be employed by the AI computing device 22.

After having transformed the input signal into a transformed output signal, the transformed output signal is provided from the AI computing device 22 via the smart sound system 14 to the speakers 18 according to this embodiment. Accordingly, the speakers 18 generate output sounds based on the received output signals.

In different embodiments, the AI algorithm including the multiple GANs may also form part or be implemented within the smart sound system 14. Put differently, the smart sound system 14 and the AI computing device 22 may form a single component.

Optionally, the transformed output signal may also be distributed via the server circuit 26 to the mobile devices 28. Accordingly, in some embodiments the mobile devices 28 may also be used to output sounds based on the received transformed output signals.

Generally, the communication between the components of the system 12 including the communication with the server circuit 26 and the mobile devices 28 may be wireless, for example according to a Wi-Fi standard or a mobile phone communications standard, such as 5G.

Although not shown within this embodiment, the communication between the smart sound system 14, the AI computing device 22, the bus system 24, the server circuit 26, and the mobile devices 28 may be bidirectional.

Figure 4:
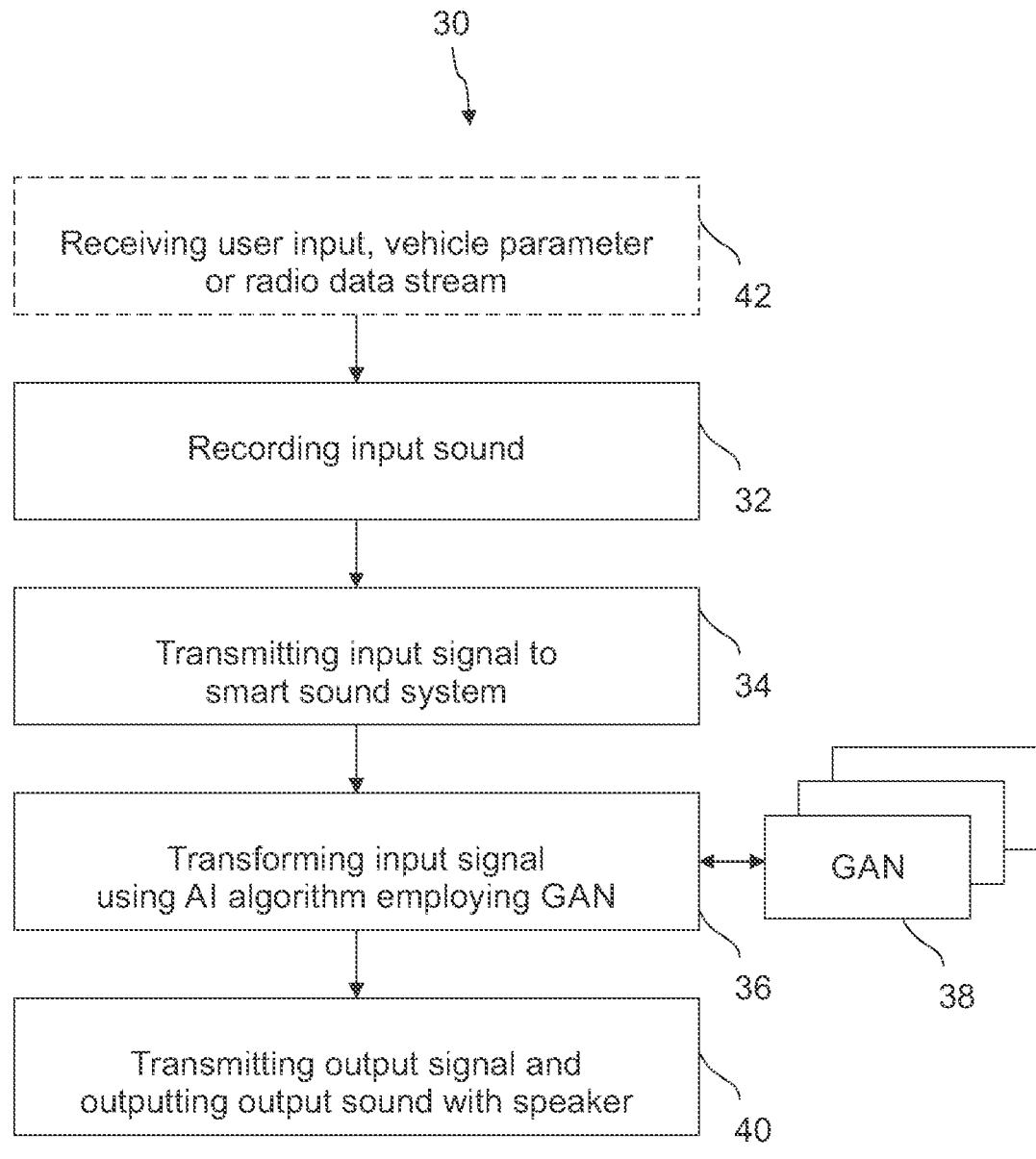
FIG. 4 is a schematic drawing of the method according to an embodiment.

FIG. 4 is a schematic drawing of the method 30 of operating a vehicle 10 according to an embodiment. Optional steps are shown using dashed lines.

At step 32, an input sound external to the vehicle 10 is recorded using at least one sound receiver sensor, such as a microphone 16.

Subsequently, an input signal being based on the recorded input sound is transmitted in step 34 to the smart sound system 14.

At step 36, the received input signal is transformed according to at least one transformation configuration into a transformed output signal using at least one data processing circuit 20 of the smart sound system 14. In this regard, an AI algorithm is applied based on at least one GAN 38. Generally, multiple different GANs 38 are provided, where each GAN is assigned to a different transformation configuration. Accordingly, the input signal may generally be transformed according to different transformation configurations.

The transformed output signal is transmitted to the speakers 18 and outputted as output sounds in step 40.

Optionally, the method 30 may also comprise the step 42, where a user input, a vehicle parameter, or a radio data stream is received or acquired and included for determining the transformation configuration to be employed. Step 42 is generally carried out prior to step 36, whereas the exact sequence of step 42 with respect to steps 32 and 34 is unimportant.

For acquiring a radio data stream, the smart sound system 14 may also be coupled to a radio device of the vehicle 10. The radio data stream may be provided as well by the BUS system 24.

Figure 5:
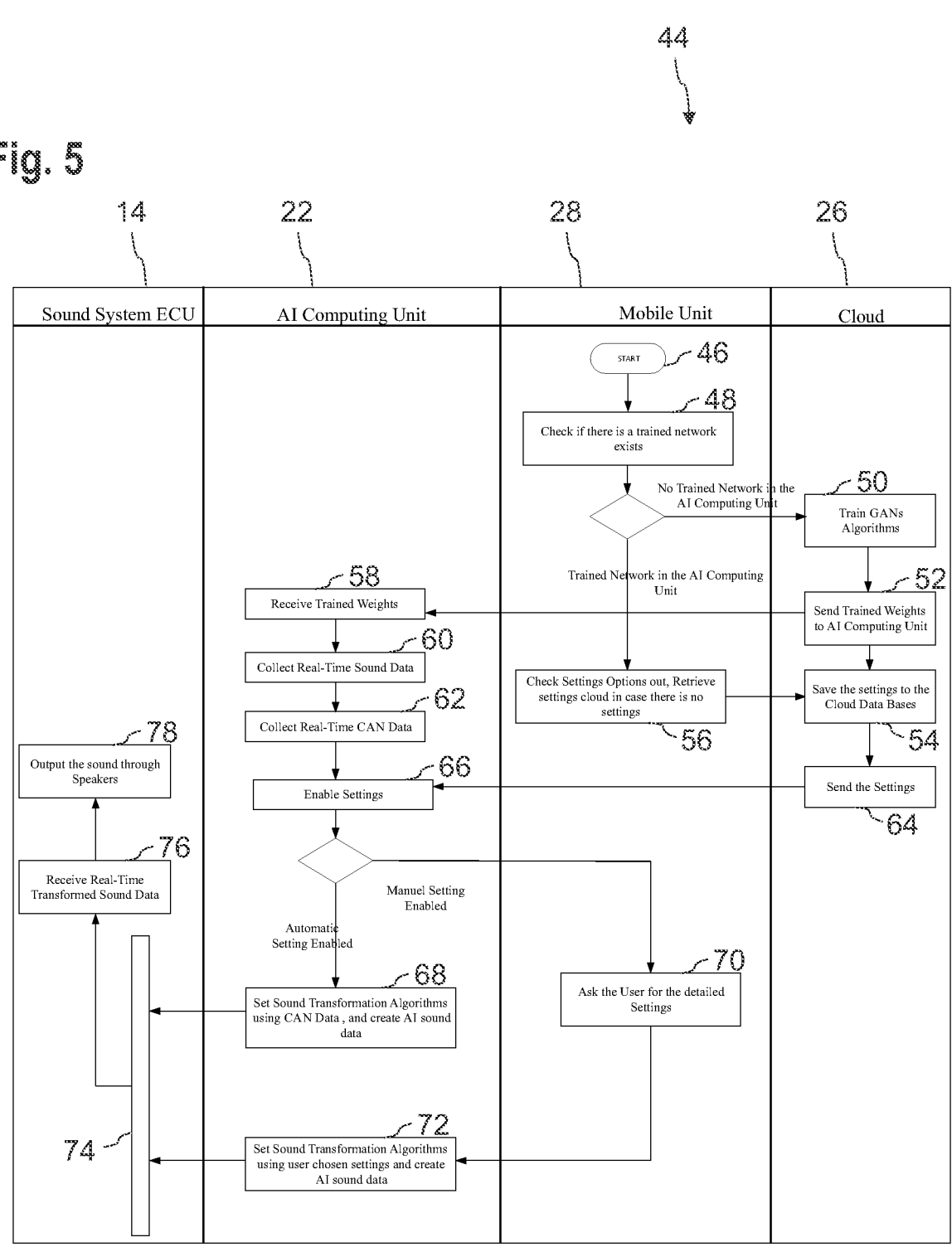
FIG. 5 is a schematic activity diagram of the system according to an embodiment.

FIG. 5 is a schematic activity diagram 44 of the system 12 according to an embodiment.

Subsequent to start 46, a mobile device 28 checks at step 48 whether a trained neural network exists as part of the AI computing device 22 or, optionally, of the smart sound system 14.

If no trained neural network being part of a GAN 38 of the AI computing device 22 exists, at step 50, at least one (or multiple) GAN is trained under the supervision of the server circuit 26.

Once the training procedure is completed, the server circuit 26 sends the results of the training procedure describing the weights of the neurons of the underlying neural networks of the GANs to the AI computing device 22 at step 52.

At step 54, the training results are stored within a data storage device coupled to the server circuit 26 where the training results describe the weights of neurons to be used according to available transformation configurations. Optionally, the different transformation configurations also include configurations for use with specific user inputs, vehicle parameters or radio data streams. In other words, training is performed in view of the GAN of a specific transformation configuration. The settings are stored at step 54 for those training procedures of those transformation configurations for which the training has been completed. If in view of a specific transformation configuration to be applied, the training has not yet been finished, obviously the settings cannot be stored at step 54. Spoken differently, at step 54 the available range of transformation configurations is determined by those training results which are stored with the server circuit 26.

If a trained neural network being part of a GAN of the AI computing device 22 exists, the mobile device 28 checks at step 56 whether specific settings with regard to the available transformation configurations of the trained neural network are present. This means that at step 56 the mobile device 28 checks for the available range of transformation configurations. In this regard, the mobile device 28 may optionally receive the range of available transformation configurations from the server circuit 26 at step 56.

Once the training procedure with regard to the neural networks of the GANs is completed or once respective trained parameters describing the weights of the neurons of the neural networks are known, the AI computing device 22 receives these parameters from the server circuit 26 at step 58.

Furthermore, at step 60 the AI computing device 22 receives input signals being based on input sounds recorded by means of at least one sound receiver sensor, such as a microphone 16.

Optionally, at step 62 the AI computing device 22 also receives CAN data of the bus system 24 of the vehicle 10 specifying vehicle parameters.

At step 64, the server circuit 26 sends the settings with regard to the available transformation configurations of the trained neural network describing the weights of the neurons of the neural networks as well as the specified transformation configurations to the AI computing device 22.

At step 66, the settings are enabled by the AI computing device 22.

According to the present embodiment, at step 68, a signal transformation is enabled by the AI computing device 22 based on the input signal received at step 60 and the CAN data received at step 62. The signal transformation at step 68 represents a case where no personalization is specified by a user, i.e. no user input is included in determining the respective transformation configuration to be employed. Although no user input is considered, the AI computing device 22 may automatically transform the input signal into the transformed output signal and include (embed) specific information based on the CAN data.

Alternatively or cumulatively, the AI computing device 22 communicates with the mobile device 28 to request a user input.

If at step 70 user inputs are provided, the AI computing device 22 employs a specific transformation configuration being assigned to the respective user input. Accordingly, the transformation process is altered in a sense that a specific transformation configuration is employed in step 72 based on the user input received. Based on the adjusted transformation processes using the respective settings of the GANs, a transformed output signal is generated also considering the specified user input in step 72.

At step 76 at least one speaker 18 receives from the AI computing device 22 the transformed output signal which has been generated in step 68 and/or step 72. In this regard, a selector 74 may be implemented which determines the transformed output signal to be used. For example, if a particular user input has been specified by the user in step 70, the transformed output signal generated in step 72 may be selected. If no user input is received, the transformed output signal generated in step 68 may be chosen instead.

By the speaker 18, output sounds are generated based on the received transformed output signal at step 78.

It is to be understood that the activity diagram 44 is only exemplary and several modifications may be performed by the skilled artisan. For example, the transformed output signal may alternatively or in addition be outputted with the mobile device 28 as well.

The transformation process using the herein described method 30 may substantially affect the input sounds recorded. By applying the method 30, the signal transformation may result in output sounds which cause less stress to the driver. For example, the output sounds may be transformed into more relaxing sounds. Accordingly, the driver still is provided with outside information such that he has situational awareness but is not negatively affected regarding his mood.

Figure 6:
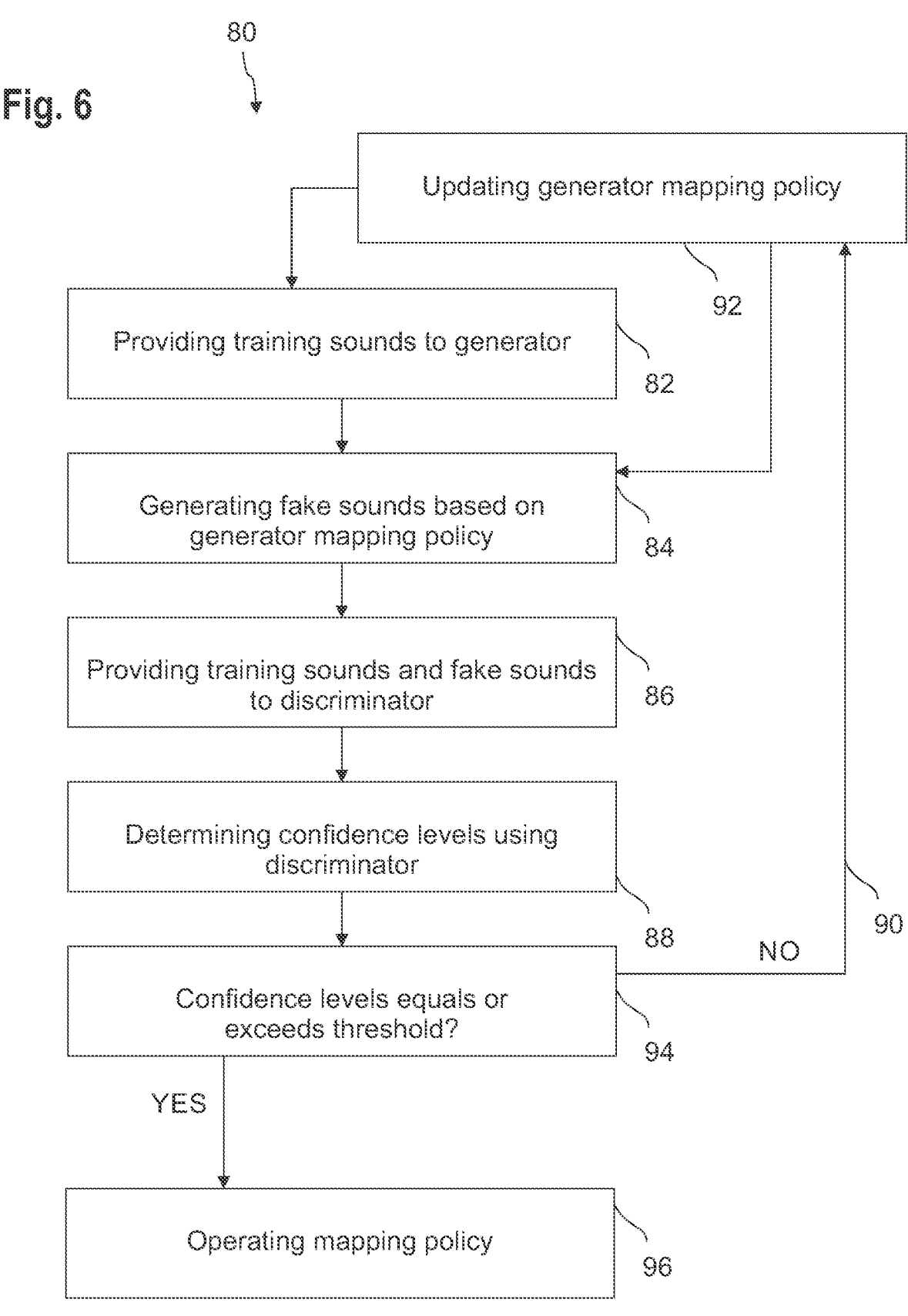
FIG. 6 is a schematic drawing of a training method of a GAN according to an embodiment.

FIG. 6 is a schematic drawing of a training method 80 of a GAN 38 according to an embodiment. In view of each of the different transformation configurations, for example based on different user inputs or vehicle parameters, a separate GAN 38 is trained and included within the AI computing device 22 or, optionally, the smart sound system 14. The GAN 38 and can be software- and/or hardware-based.

At step 82, at least one training sound (or a respective input signal representing a training sound) is provided as an input to a generator of the respective GAN 38. The generator comprises a first neural network of the GAN 38.

At step 84, at least one fake sound (or a respective fake signal representing a fake sound) associated to the at least one training sound is generated using the generator based on a generator mapping policy assigned to the generator. The generator mapping policy describes the weights of the neurons of the underlying neural network of the generator during generating the at least one fake signal.

At step 86, the at least one training sound and the at least one fake sound associated thereto are provided as an input to a discriminator of the respective GAN 38. The discriminator comprises a second neural network of the GAN 38.

At step 88, a confidence level matrix in view of the at least one training sound and the at least one fake sound associated thereto is determined using the discriminator. The confidence level matrix determines whether a respective sound of the at least one fake sound and the received training sound is considered authentic.

Several repetitions 90 of the steps 82 to 88 are performed. Upon the repetitions 90, the generator mapping policy is adapted at step 92. This means that the generator mapping policy is adjusted at step 92 in view of individual weight levels included therein upon repetitions 90 at least until the confidence level matrix comprises individual confidence levels being equal to or exceeding a confidence level threshold. In other words, the generator mapping policy is adjusted so that the generator generates more realistic fake sounds being tougher to evaluate for authenticity in view of the original input sound associated thereto. The goal is to adjust the generator such that the fake sounds may be considered authentic at equal probability compared to the original input (training) sound. Then, the generator is optimized to generate realistic fake sounds.

Once the confidence level matrix comprises individual confidence levels being equal to or exceeding the confidence level threshold at step 94, an operating mapping policy is determined at step 96 including at least the so-adjusted generator mapping policy. This operating mapping policy may be considered to represent the parameters used in view of the respective GAN 38 during use phases. The operating mapping policy comprising the trained parameters describing the weights of the neurons of the neural networks of the respective GAN 38 are received by the AI computing circuit 22 in step 58 of the activity diagram 44.

Figure 7:
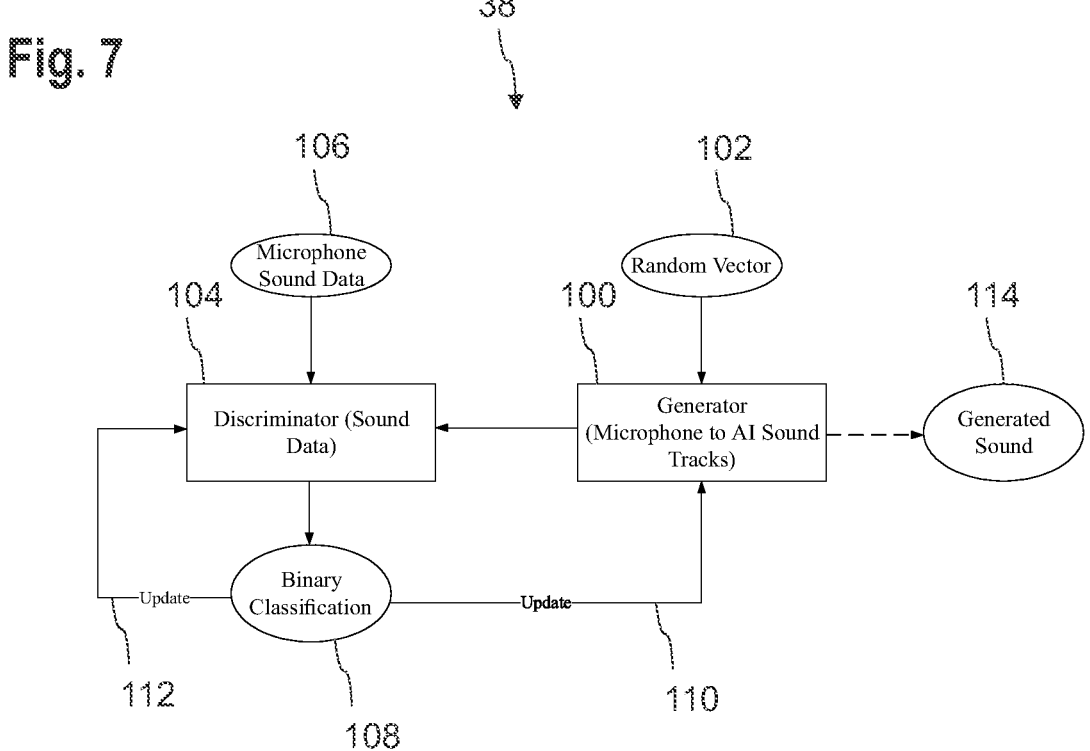
FIG. 7 is a schematic drawing of a GAN algorithm according to an embodiment.

FIG. 7 is a schematic drawing of a GAN algorithm 38 according to an embodiment.

The generator 100 of the GAN algorithm 38 receives a random vector 102 and generates fake sounds. These fake sounds are provided to the discriminator 104. According to this example, the discriminator 104 also receives the input sound 106 acquired using at least sound receiver sensor, such as a microphone 16.

At step 108, the discriminator 104 classifies the received fake sounds and the input sound 106 to be authentic or to be fake. In other words, the discriminator evaluates the authenticity of the received sounds. Based on the findings with regard to authenticity, the generator mapping policy is adapted upon repetitions 110 of the cycle.

Optionally, also the discriminator mapping policy describing the procedures to evaluate authenticity of the received signals may be adapted upon repetitions 112.

Once a confidence level threshold is achieved or exceeded, the generator mapping policy has been sufficiently adjusted. Thereby, the training procedure may be considered to be finished. The so-adjusted generator mapping policy may be used to generate transformed output signals (representing output sounds) at step 114 during "in-field" use phases of the GAN algorithm 38.

Certain embodiments disclosed herein, particularly the respective module(s), utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry such as the data processing circuit, the smart sound system, and the AI computing device includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like in, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about", "approximately", "near" etc., mean plus or minus 5% of the stated value.

Although the disclosure has been illustrated and described with respect to one or more implementations, equivalent alterations and modifications will occur to others skilled in the art upon the reading and understanding of this specification and the annexed drawings. In addition, while a particular feature of the disclosure may have been disclosed with respect to only one of several implementations, such feature may be combined with one or more other features of the other implementations as may be desired and advantageous for any given or particular application.

What is claimed is:

1. A system for operating a vehicle, comprising:
at least one sound receiver sensor;
at least one speaker arranged inside a vehicle cabin;
a smart sound system, wherein the smart sound system being coupled to at least the at least one sound receiver sensor and the at least one speaker, the smart sound system including a computer processor configured to perform the steps of:
recording an input sound external to the vehicle using the at least one sound receiver sensor;
transmitting an input signal based on the recorded input sound to the smart sound system;
transforming the input signal according to at least one transformation configuration of a plurality of different transformation configurations into a transformed output signal by applying an artificial intelligence algorithm based on at least one generative adversarial network of a plurality of different generative adversarial networks, wherein each generative adversarial network is assigned to a different transformation configuration; and
transmitting the transformed output signal to the at least one speaker and outputting an output sound being based on the transformed output signal with the at least one speaker, wherein the transformed output signal output by the at least one speaker is produced by the at least one generative adversarial network.

2. The system of claim 1, wherein the smart sound system is coupled to at least one human-machine-interface configured to receive at least one user input, and wherein the at least one transformation configuration is determined at least partially based on the at least one user input.

3. The system of claim 1, wherein the smart sound system is coupled to a bus system of the vehicle, and wherein the at least one transformation configuration is determined at least partially based on vehicle parameters communicated via the bus system.

4. The system of claim 1, wherein the smart sound system is coupled to a radio device of the vehicle, and wherein the at least one transformation configuration is determined at least partially based on a signal received by the smart sound system from the radio device.

5. The system of any one of claim 1, wherein the vehicle comprises an artificial intelligence computing device being coupled to the smart sound system, and wherein the artificial intelligence computing device comprises the artificial intelligence algorithm.

6. The system of claim 5, wherein the smart sound system is coupled to a server circuit, and wherein the smart sound system is configured to receive at least one operating mapping policy from the server circuit, wherein the least one operating mapping policy comprises weights of neurons included in at least one neural network to be applied by the artificial intelligence algorithm of the artificial intelligence computing device.

7. The system of claim 6, wherein the at least one operating mapping policy is determined based on at least the following steps:

providing, as an input to a generator of the respective generative adversarial network, at least one training sound, wherein the generator comprises a first neural network;

generating, using the generator, as an output at least one fake sound associated to the at least one training sound based on a generator mapping policy assigned to the generator;

providing, as an input to a discriminator of the respective generative adversarial network, the at least one training sound and the at least one fake sound associated thereto, wherein the discriminator comprises a second neural network; and determining, using the discriminator, as an output a confidence level matrix in view of the at least one training sound and the at least one fake sound associated thereto, wherein the confidence level matrix determines whether a respective sound of the at least one training sound and the at least one fake sound is considered authentic, wherein the generator mapping policy is adjusted in view of individual weight levels included therein upon repetitions of the steps at least until the confidence level matrix comprises individual confidence levels being equal to or exceeding a confidence level threshold, and wherein the at least one operating mapping policy at least includes the adjusted generator mapping policy.

8. A vehicle for providing a transformed cabin sound, the vehicle comprising:

at least one sound receiver sensor;

at least one speaker arranged inside a vehicle cabin;

a smart sound system, wherein the smart sound system is coupled to at least the at least one sound receiver sensor and the at least one speaker, the smart sound system including a data processing circuit configured to:

record an input sound external to the vehicle using the at least one sound receiver sensor;

transform an input signal being based on the recorded input sound according to at least one transformation configuration of a plurality of different transformation configurations into a transformed output signal by applying an artificial intelligence algorithm based on at least one generative adversarial network of a plurality of different generative adversarial networks, wherein each generative adversarial network is assigned to a different transformation configuration;

transmit the transformed output signal to the at least one speaker; and output an output sound being based on the transformed output signal with the at least one speaker, wherein the transformed output signal output by the at least one speaker is produced by the at least one generative adversarial network.

9. The vehicle of claim 8, wherein the vehicle is configured to be coupled to at least one human-machine-interface configured to receive at least one user input, and wherein the smart sound system is further configured to determine the at least one transformation configuration at least partially based on the at least one user input.

10. The vehicle of claim 8, wherein the vehicle is configured to be coupled to a bus system of the vehicle, and wherein the smart sound system is further configured to determine the at least one transformation configuration at least partially based on vehicle parameters communicated via the bus system.

11. The vehicle of claim 8, wherein the vehicle is configured to be coupled to a radio device of the vehicle, and wherein the smart sound system is further configured to determine the at least one transformation configuration at least partially based on a signal received by the smart sound system from the radio device.

12. A method for providing a transformed cabin sound in a vehicle, comprising:

recording an input sound external to the vehicle using at least one sound receiver sensor;

transmitting an input signal based on the recorded input sound to a smart sound system;

transforming the input signal according to at least one transformation configuration of a plurality of different transformation configurations into a transformed output signal by applying an artificial intelligence algorithm based on at least one generative adversarial network of a plurality of different generative adversarial networks, wherein each generative adversarial network is assigned to a different transformation configuration; and transmitting the transformed output signal to at least one speaker and outputting an output sound being based on the transformed output signal with the at least one speaker, wherein the transformed output signal output by the at least one speaker is produced by the at least one generative adversarial network.

13. The method of claim 12, wherein the smart sound system is coupled to at least one human-machine-interface configured to receive at least one user input, and wherein the at least one transformation configuration is determined at least partially based on the at least one user input.

14. The method of claim 12, wherein the vehicle comprises an artificial intelligence computing device being coupled to the smart sound system, and wherein the artificial intelligence computing device comprises the artificial intelligence algorithm.

* * * * *